July 28, 1936.  R. A. DEMPSEY ET AL  2,048,924
CONTROL
Filed Sept. 27, 1930  4 Sheets-Sheet 1
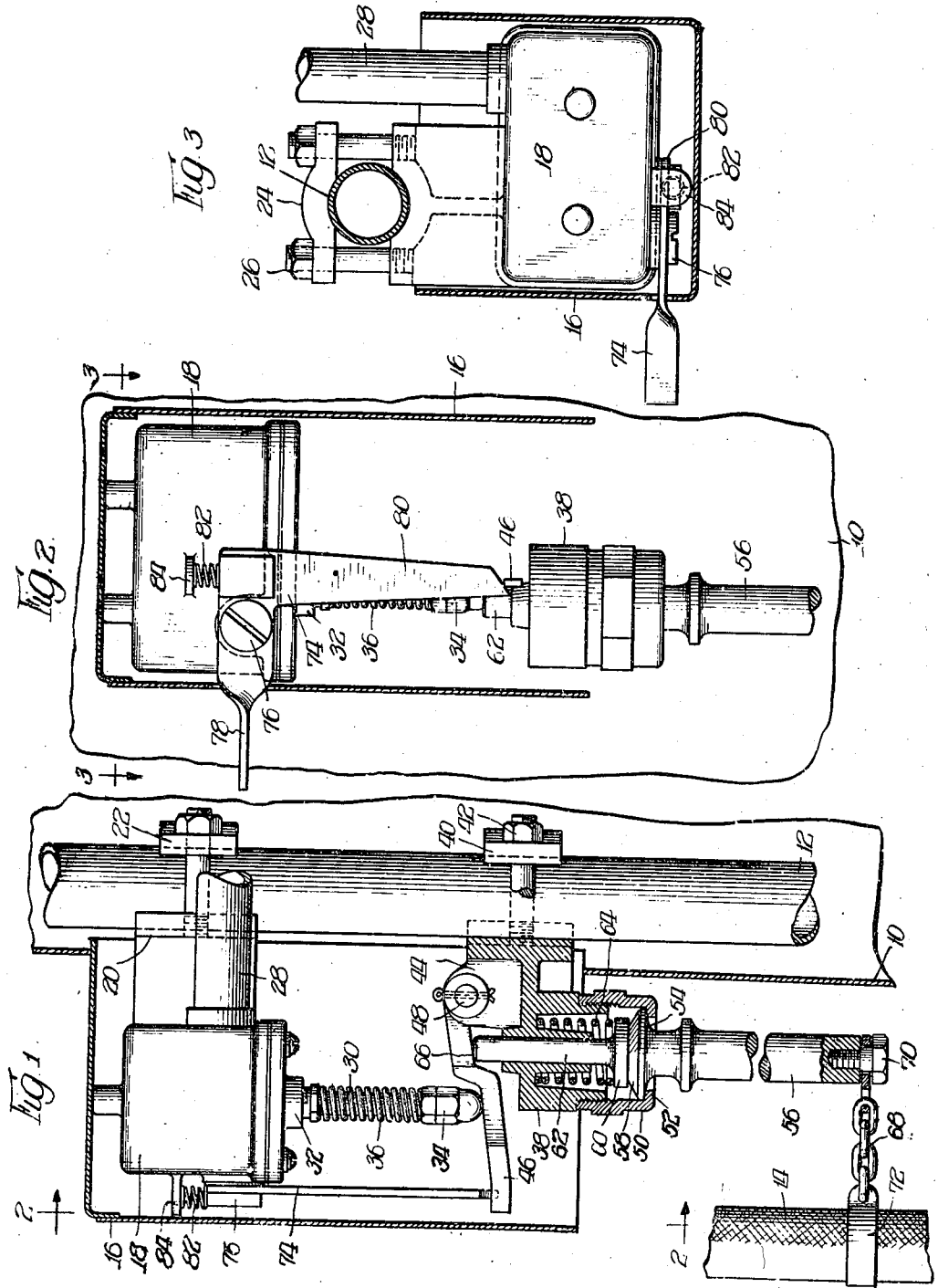
Inventors:
Russell A. Dempsey,
William Halkenhauser,
By Wilkinson, Huxley, Byron & Knight
Attys.

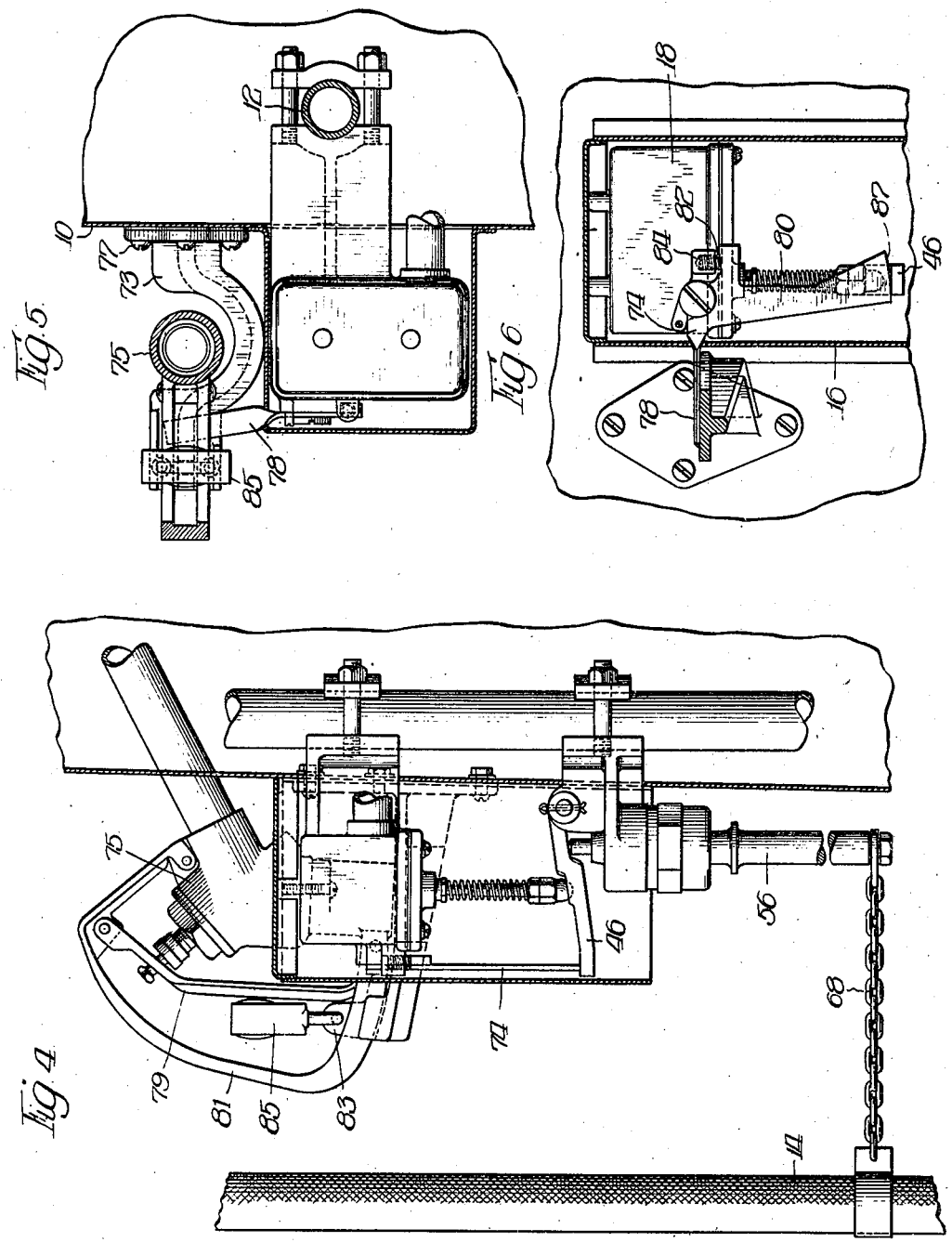

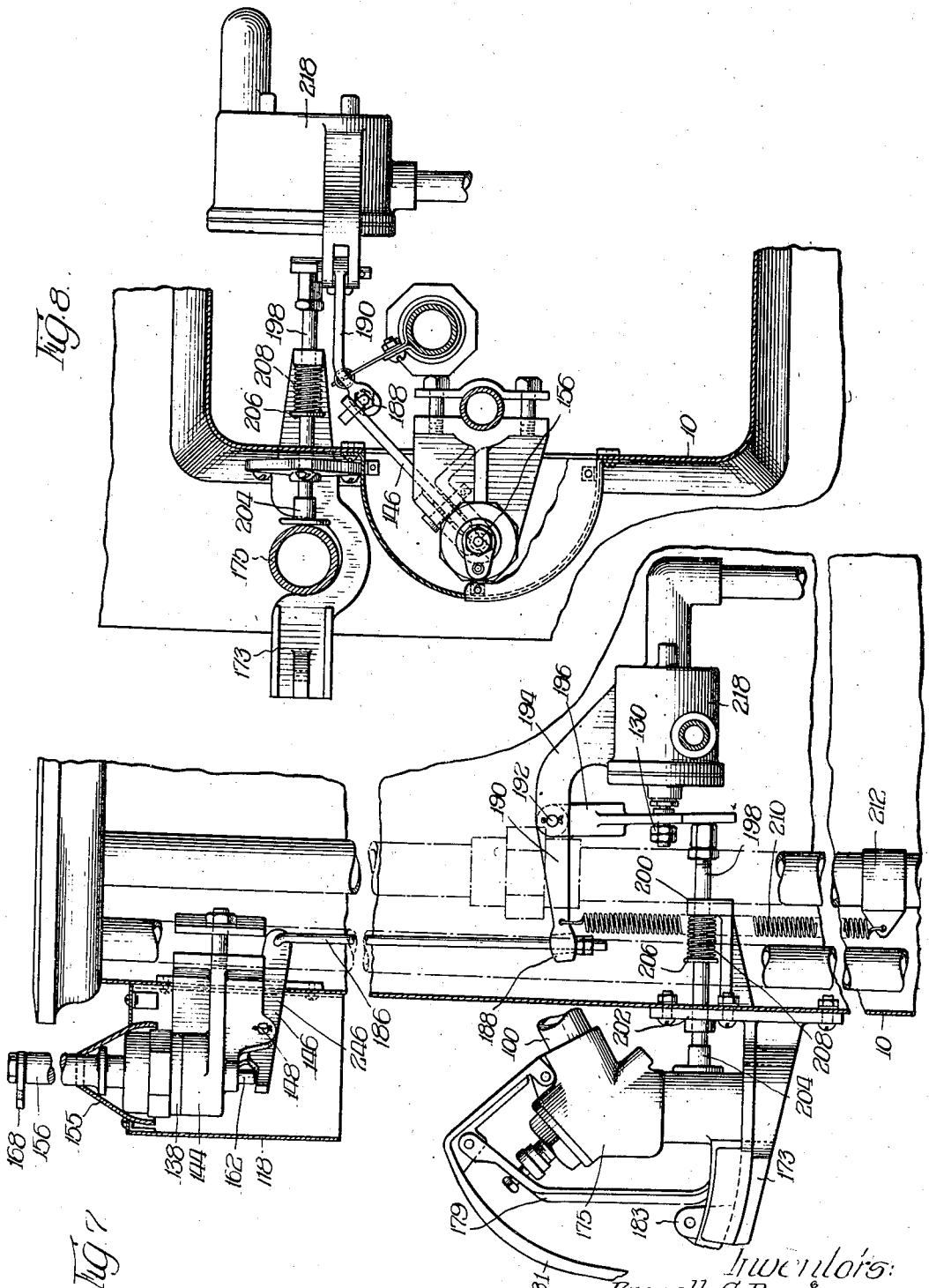

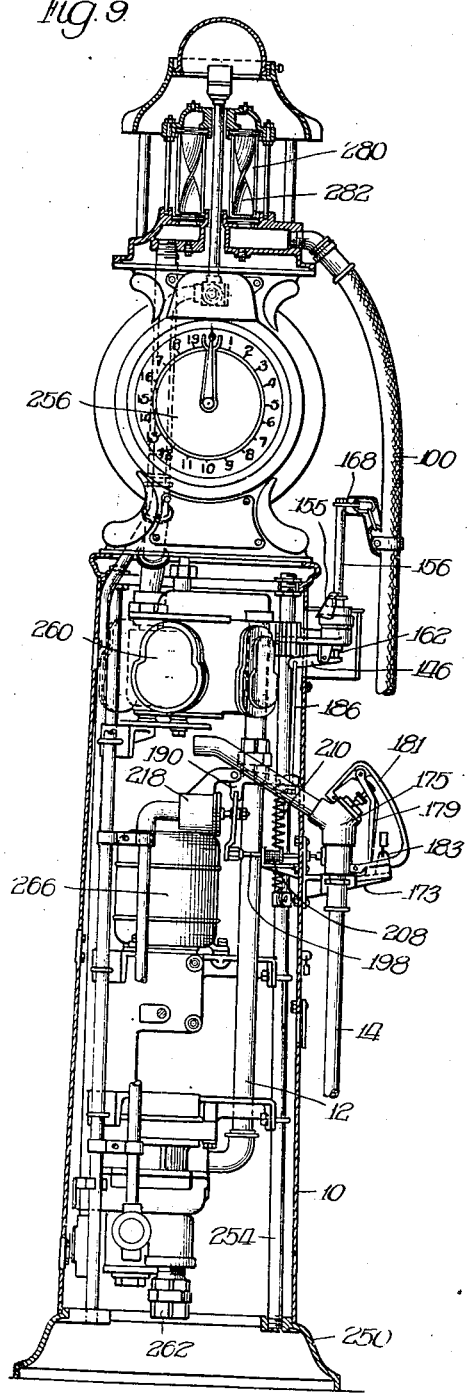

Patented July 28, 1936

2,048,924

UNITED STATES PATENT OFFICE 2,048,924

CONTROL

Russell A. Dempsey, Chicago, Ill., and William Halkenhauser, Unionport, N. Y., assignors to Wayne Company, Fort Wayne, Ind., a corporation of Indiana Application September 27, 1930, Serial No. 484,752

31 Claims. (Cl. 221—95)

This invention pertains to liquid dispensing apparatus, and more particularly to an automatic control for said apparatus or the like.

Liquid dispensing apparatus at present in use are principally either of two types. Namely, the visible type, or the meter type. The visible type of dispensing apparatus consists essentially of a casing or support having a measuring container superimposed thereon from which gasolene to be dispensed is conducted to a vehicle or other tank through a discharge hose provided with a suitable nozzle. The gasolene may be supplied to the measuring container by a pump, either manually operated or motor driven, the motor being controlled by electricity or some other means. A dispensing apparatus of the meter type consists essentially of a casing or support having a meter therein adapted to register the amounts of liquid discharged through a suitable hose, the meter being supplied with liquid from a pump suitably operated. In either case, it is necessary for an attendant to remove the nozzle from its usual support on the casing and apply it to the reservoir to be filled. In certain types it has then been customary for the attendant to leave the nozzle end of the hose and return to the casing to operate suitable means to permit discharge, with the result that not infrequently the gasolene dispensed overflows before the apparatus can effectively control it, wasting an appreciable amount.

There are other forms of devices through which fluid is supplied to a point remote from the machine, and it is an object of this invention to provide a control which is operable by the discharge means for immediately and effectively controlling discharge from said means.

Another object of the invention is to provide an automatic discharge control for liquid dispensing apparatus wherein the control of liquid can be effected from a point remote from the dispensing apparatus.

Another object of the invention is to provide a simple, effective, yet inexpensive control means for liquid dispensing apparatus which is effective in operation, simple, inexpensive to make, and maintain, and one which can be applied to existing as well as new and specially constructed units.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation of a liquid dispensing apparatus embodying the invention;

Figure 2 is a fragmentary sectional elevation taken substantially in the plane as indicated by the line 2—2 of Figure 1, and showing the device in operative position;

Figure 3 is a fragmentary sectional top plan view taken substantially in the plane as indicated by the line 3—3 of Figure 2;

Figure 4 is a sectional elevation corresponding to Figure 1 showing the hose nozzle in inoperative position;

Figure 5 is a sectional top plan view of the assembly shown in Figure 4;

Figure 6 is a fragmentary sectional side elevation showing the relation of the lock and bell crank to the nozzle support;

Figure 7 is a fragmentary sectional elevation corresponding to Figure 1 showing a modified form of the device;

Figure 8 is a fragmentary sectional top plan view of the mechanism shown in Figure 7.

Figure 9 is a fragmentary sectional elevation of a meter type liquid dispensing apparatus embodying one form of the invention; and—

Figure 10 is a fragmentary sectional elevation of the liquid dispensing apparatus shown in Figure 9, the same being taken substantially at 90° to said Figure 9.

In the constructions to be specifically described, it will of course be understood that the same is applicable to any form of liquid dispensing apparatus or any apparatus provided with discharge means through which fluid to be dispensed is conducted to a point remote from the apparatus, and it will be understood that though the device as shown is applied in certain positions, it is not at all limited to being provided in those positions, as it is of substantially universal application.

Referring first of all more particularly to Figures 1 to 6, inclusive, the casing 10 of the apparatus is provided with the usual riser pipe 12 and the dispensing hose 14 leading upwardly either to the visible measuring container or to the visible flow indicator of the meter pump type of apparatus. The casing 10 is apertured for the reception of the casing 16, said casing 16 containing switch box 18 which may be either of the electrical type or of the fluid type. The switch box as shown is secured to the riser pipe 12 by the bracket 20 through suitable securing means 22 which may take the form of a yoke 24 and studs 26, the fluid conduit or electrical connection casing 28 extending from the switch box inwardly of the casing 10. The piston rod or plunger 30 extends inwardly of the switch box for controlling the switch mechanism therein and extends through the stuffing box 32 and is provided with a shouldered rounded tip 34 between which and the stuffing box there is provided the expansion spring 36 embracing the plunger 30.

A control casing 38 is secured through the yoke 40 and studs 42 to the riser pipe 12 adjacent the switch box, said control casing being provided with a lug 44 to which switch lever 46 is pivoted as at 48, the switch lever extending outwardly and substantially contacting the round tip 34. The control casing is also provided with a control body cap 50 having the flanged or shouldered portion 52 adapted to supportingly engage the shoulders 54 of the control lever 56 extending downwardly therefrom. The control lever is provided with a rounded cam portion 58 adapted to have engagement with the head 60 of the push rod 62, the coil expansion spring 64 being disposed between the head 60 and the control body casing normally urging the push rod downwardly. The push rod extends through the top of the casing and is adapted to contact the shoulder or offset 66 provided on the lever 46.

A suitable link connection 68 is secured to the control lever 56 by means of a bolt 70 and extends to and is secured to the collar 72 embracing the discharge hose 14. Supporting means 73 is provided for the nozzle 75 of the discharge hose which functions as a lock for the mechanism. This support or lock may conveniently be in the form of a bell crank 74 pivoted as at 76 to the switch box, one leg 78 thereof extending through the casing 16 for engagement by the discharge nozzle when hung in inoperative position either thereon or adjacent thereto. The depending leg 80 of the bell crank is adapted to be normally positioned out of the path of the lever 46, that is, it is normally urged by the spring 82 into a position to permit upward movement of the member 46 by means of the extension spring 82 disposed to contact the leg 80 and a lug 84 provided on the switch box. The leg 80 may be undercut in way of the lever 46 to form a stop in one direction, the casing 16 forming a stop for the bell crank in the opposite direction.

The support 73 is secured to the casing 10 as by means 77, said support being substantially U-shaped in order to accommodate the nozzle 75. The nozzle 75 which is provided with a control and operated by the lever 79 pivoted to the handle 81 is adapted to fit into or be embraced by a portion of the support 73 as shown in Figure 5. The arm 78 of the bell crank 74 extends outwardly of the housing 16 and is adapted to be engaged by the handle 81 to be depressed thereby against the support 73 for rendering the control of the apparatus inoperative. The handle rests on the support 73 and is adapted to be embraced by the upwardly extending spaced arms 83 which are apertured to receive the lock 85, which lock renders the nozzle and the apparatus inoperative.

In Figure 6 the leg 80 is shown as being provided with the cam 87 instead of the undercut portion, the cam being adapted to be disposed in way of the member 46 for rendering the switch mechanism 18 inoperative.

In operation, assuming the discharge nozzle to be in engagement with the member 78, as shown in Figure 7, the leg 80 will be revolved into a position to prevent upward movement of the member 46 and consequently to prevent operation of the switch. When the nozzle is removed the expansion spring 82 will move the leg 80 out of restricting position with respect to the member 46. It will then be possible for the operator to insert the nozzle into the reservoir to be supplied with fluid and regardless of the position of the reservoir with respect to the liquid dispensing apparatus he may move the hose 14 sufficiently to move the control lever 56 through the links 68, movement of the control lever to any position, say toward the left, as viewed in Figure 1, causing the cam 58 to move upwardly around the fulcrum established between the right rim of the lever and the flange 52, causing upward movement of the push rod 62 compressing the spring 64. This upward movement will cause upward movement of the push rod 30 through the lever 46, thereby causing the switch in the casing 18 to cause dispensing or pumping operation. After a sufficient amount of liquid has been dispensed release of the hose will cause the control lever to assume the position shown in Figure 1, permitting the spring 64 to move the push rod to its normal position and permitting the spring 36 to move the rod 30 to normal position causing the switch in the casing 18 to assume an inoperative position where pumping and discharge will cease. Of course, the mechanism will then be in a position for successive operations until such time as the hose nozzle is again hung on or hung into position to engage the member 78 to depress the same, whereupon member 80 will be moved into a position to render the lever 46 inoperative.

Referring now more particularly to the form of device illustrated in Figures 7 and 8, the housing 118 is provided with the casing 138 containing the lever 156, said lever being secured through the proper linkage 168 to the hose 100, the connection not being shown. A hood 155 may be provided, carried by the lever 156 and extending into the housing 118 to prevent entrance of foreign substances therein. The push rod 162, spring-depressed as in the case of the push rod 62 in Figure 1, is adapted to have contact with the pivoted lever 146 pivoted as at 148 to the bracket 144. The end 246 of the lever is provided with the rod 186 pivoted by the loose connection 188 to the bell crank 190, said bell crank being pivoted as at 192 to the bracket 194 provided on the switch or control box 218, the leg 196 of the bell crank being adapted to control the piston rod or plunger 130 controlling said switch box.

The leg 196 is extended to contact the push rod 198 slidably secured in the bracket 200 and extending outwardly of the casing through the journal 202 to be disposed to be contacted by the nozzle 175 when said nozzle is received by the bracket 173. The rod is provided with the nozzle engaging button 204 and the washer 206 between which and the member 200 there is provided the coil spring 208 normally urging the rod 198 outwardly, that is, out of engagement with the bell crank arm 196. A spring 210 is also provided between the bracket 212 and the bell crank 190 normally urging the bell crank to a position wherein the switch will be in off position.

In operation, then, when the nozzle is in the position shown in Figures 7 and 8, that is, inoperative position, on the bracket 173 wherein the handle 181 is retained between the ears 183 of the bracket, the nozzle will urge the push rod 198 toward the right as viewed in Figure 7, moving the leg 196 of the bell crank in a counter-clockwise direction wherein the switch or control means will be in off position. Release of the nozzle 175 from the bracket permits the spring 208 to move the rod 198 out of engagement with the leg 196 of the bell crank, whereupon movement of the hose to move the lever 156 causes the lever to operate the push rod downwardly, raising the leg 246 of the lever 146, causing upward movement of the link 186. Upward movement of the link causes the bell crank 190 to move in a clockwise direction, whereupon the switch box or control means will move to operative position, whereupon operation of the control lever 179 of the nozzle will permit discharge of liquid from the pump. Release of the hose will cause release of the control lever 156, permitting the spring 210 to move the bell crank 190 in a counter-clockwise direction, causing the control means or switch to render the dispensing apparatus inoperative.

Figures 9 and 10 show the application of the form of invention shown in Figures 7 and 8 to a liquid dispensing apparatus of the meter type. In this type of apparatus the casing 10 is provided with the pedestal 250 and a head portion 252, suitable tie rods 254 being provided to form a unitary structure. The head 252 supports the indicating or clock mechanism 256 provided with the proper dial and pointer for indicating the amounts of liquid dispensed, the pointer mechanism being operated through a suitable coupling 258 by the meter 260. Liquid is drawn from the storage tank (not shown) through the pipe 262 by means of the pump 264 normally operated by the electric motor 266, said motor being controlled through the switch 218, the operation of the switch being described above. The motor shaft 268 driving the pump is connected through the gearing 270 with the revoluble socket 272 adapted to receive a hand crank in the event the motor is rendered inoperative for any reason, a suitable clutch 274 being provided whereby in the event the hand means is used it will not be necessary to revolve the armature of the motor.

The casing is provided with an aperture normally closed by the guard 276 for insertion of the hand crank. Liquid drawn from the tank by the pump 264 is pumped through the riser pipe 12 to the meter 260, causing the meter to operate the clock by means of the coupling 256. The liquid then passes upwardly through the pipe 278 to the liquid flow indicator 280, passing through the flow indicator, revolving the spiral members 282, and thence outwardly through the hose 100 and the nozzle 175.

The nozzle, as shown, is supported on the bracket 173 in a manner shown and described with respect to Figure 8, and the operation of the control device is in a manner as has already been described. As shown, the hose is connected through suitable linkage 168 to the lever 156, which in turn is adapted to depress push rod 162 to operate the lever 146 whereby a pull on the hose 100 effects movement of the bell crank 190 for operating the switch 218 when the nozzle is released from the bracket 173. Of course, when the nozzle is in position on the bracket 173, the push rod 198 would prevent movement being communicated from the lever 156 to the switch 218.

It is to be understood that we do not wish to be limited by the exact embodiment of the device shown, which is merely by way of illustration and not limitation, as various and other forms of the device will of course be apparent to those skilled in the art without departing from the spirit of the invention herein disclosed.

We claim:

1. In liquid dispensing apparatus, the combination of a discharge hose, a control device for effecting operation of said apparatus to discharge through said hose, said device including a switch, an operating member therefor, a spring cooperating with said operating member for normally urging said switch to inoperative position, a lever disposed adjacent said switch, a member disposed between said lever and operating member, a spring cooperating with said second named member for urging said lever to inoperative position, a connection between said hose and lever whereby movement of said hose moves said lever and said members to operate said switch to operative position to effect discharge through said hose.

2. In control mechanism, the combination of a switch having an operating plunger, means for operating said switch, said means including a rocking member operable substantially in a universal manner, and a translatory member interposed between said switch and rocking member cooperating with said operating plunger.

3. In control mechanism, the combination of a switch, means for operating said switch, said means including a rocking member operable substantially in a universal manner, and a translatory member interposed between said switch and rocking member, and a locking member for preventing operation of said switch.

4. In control mechanism, the combination of a switch, means for operating said switch, said means including a rocking member and a translatory member interposed between said switch and rocking member, and a locking member for preventing operation of said switch, said locking member being movable to a locking position between said switch and rocking member.

5. In control mechanism, the combination of a switch, means for operating said switch, said means including a rocking member and a translatory member interposed between said switch and rocking member, and elongated means secured to said rocking member for operating said switch at a point remote therefrom.

6. In control mechanism, the combination of a switch, an operating device for said switch, said device including a housing, said housing being provided with a slidable member, and an operating member carried by said housing and movable in a plurality of directions to move said slidable member.

7. In control mechanism, the combination of a switch, an operating device for said switch, said device including a housing, said housing being provided with a slidable member, and an operating member carried by said housing and movable in a plurality of directions to move said slidable member, and means for urging said slidable member toward said operating member.

8. In combination a switch device provided with a member movable to close said switch, a resilient member urging said member to inoperative position, an operating device disposed adjacent said switch device, said operating device including a housing having a slidable member, an operating member carried by said housing and movable to move said slidable member, a resilient member disposed in said housing urging said slidable member toward said operating member, a pivoted lever disposed between said slidable member and first named member whereby movement of said operating member and slidable member moves said pivoted lever to move said first named member to close said switch, and a member movable to engage said pivoted lever whereby said operating device is rendered inoperative.

9. In control mechanism, the combination of a switch, an operating device for said switch, said device including a housing, said housing being provided with a slidable member, and an operating member carried by said housing, said operating member having a housing engaging head and a cam portion engaging said slidable member, said operating member being movable on said housing whereby said cam portion moves said slidable member.

10. In control mechanism, the combination of a switch, an operating device for said switch, said device including a housing, said housing being provided with a slidable member, and an operating member carried by said housing, said operating member having a housing engaging head and a cam portion engaging said slidable member, said operating member being movable on said housing whereby said cam portion moves said slidable member, and resilient means in said housing urging said slidable member toward said operating member.

11. In combination, a switch device provided with a member movable to close said switch, a resilient member urging said member to inoperative position, an operating device disposed adjacent said switch device, said operating device including a housing having a slidable member, an operating member carried by said housing and movable to move said slidable member, a resilient member disposed in said housing urging said slidable member toward said operating member, a pivoted lever disposed between said slidable member and first named member whereby movement of said operating member and slidable member moves said pivoted lever to move said first named member to close said switch.

12. In combination, a switch device provided with a member movable to close said switch, a resilient member urging said member to inoperative position, an operating device disposed adjacent said switch device, said operating device including a housing having a slidable member, an operating member carried by said housing having a housing engaging head and a cam portion engaging said slidable member, said operating member being movable on said housing whereby said cam portion moves said slidable member, a resilient member disposed in said housing urging said slidable member toward said operating member, a pivoted lever disposed between said slidable member and first named member whereby movement of said operating member and slidable member moves said pivoted lever to move said first named member to close said switch.

13. In combination, a switch device provided with a member movable to operate said switch, a resilient member urging said member to inoperative position, an operating device disposed adjacent said switch device, said operating device including a housing having a slidable member, an operating member carried by said housing having a housing engaging head and a cam portion engaging said slidable member, said operating member being movable on said housing whereby said cam portion moves said slidable members, a resilient member disposed in said housing urging said slidable member toward said operating member, movement of said operating member and slidable member moving said first named member to operate said switch.

14. In combination, a switch device provided with a member movable to close said switch, a resilient member for urging said member to close said switch, a slidable member movable to move said first named member to close said switch, and resilient means for urging said slidable member to inoperative position.

15. In combination, a switch device provided with a member movable to close said switch, a resilient member for urging said member to close said switch, a slidable member movable to move said first named member to close said switch, resilient means for urging said slidable member to inoperative position, an oscillatable member, a slidable member movable by said oscillatable member, a lever movable by said last named slidable member, and means between said switch device and said lever for operating said switch device.

16. In combination, a switch device provided with a member movable to close said switch, a resilient member for urging said member to close said switch, a slidable member movable to move said first named member to close said switch, resilient means for urging said slidable member to inoperative position, an oscillatable member, a slidable member movable by said oscillatable member, a lever movable by said last named slidable member, and means between said switch device and said lever for operating said switch device when said first named slidable member is moved to inoperative position.

17. In combination, a switch device provided with a member movable to close said switch, a resilient member for urging said member to close said switch, an oscillatable member, a slidable member movable by said oscillatable member, a lever movable by said last named slidable member, and means between said switch device and said lever for operating said switch device.

18. In combination, a switch, an operating device therefor including a housing, said housing being provided with a slidable member for operating said switch, an operating member carried by said housing and movable in a plurality of directions to move said slidable member, and a hood movable with said slidable member for preventing introduction of foreign matter to said housing.

19. In liquid dispensing apparatus, the combination of a pump, a motor for operating said pump, a switch for controlling operation of said motor, a discharge hose having a nozzle, said hose being connected to said pump, a connection between said hose and switch whereby movement of said hose may operate said switch, a support for said nozzle, and a member engageable by the nozzle when in supported position for rendering said switch and said connection inoperative.

20. In liquid dispensing apparatus, the combination of a pump, a motor for operating said pump, a switch for controlling operation of said motor, a discharge hose having a nozzle, said hose being connected to said pump, a support for said nozzle, connecting means between said hose and switch for operating said switch by movement of said hose, and a member engageable by the nozzle when in supported position for rendering said switch inoperative.

21. In liquid dispensing apparatus, the combination of a pump, a motor for operating said pump, a switch for controlling operation of said motor, means mounted for substantially universal movement for operating said switch, a discharge hose having a nozzle, said hose being connected to said pump, a support for said nozzle, connecting means between said hose and said first named means for moving said first named means by any selected movement of said hose, and a member engageable by the nozzle when in supported position for rendering said switch inoperative.

22. In a dispensing system, a discharge pipe, a flexible hose attached at one end thereto, a nozzle on the other end of the hose, a support on which the nozzle may be hung when not in use, an element movable to control the flow through said pipe and hose, means interconnecting said element and hose for moving the element by pulling on the hose, and means compelling the movement of said element into position to stop said flow as a prerequisite to the placing of said nozzle on said support.

23. In a dispensing system, a discharge pipe, a flexible hose attached at one end thereto, a nozzle on the other end of the hose, a support on which the nozzle may be hung when not in use, an element movable to control the flow through said pipe and hose, means interconnecting said element and hose for moving the element by pulling on the hose, means operable to lock said element in position to stop said flow, and means compelling operation of the locking means to lock said element as a prerequisite to placing said nozzle on said support.

24. In a dispensing system, a discharge pipe, a flexible hose attached at one end thereto, a nozzle on the other end of the hose, a support on which the nozzle may be hung when not in use, an element movable to control the flow through said pipe and hose, means interconnecting said element and hose for moving the element by pulling on the hose, a second means operable independently of the first named means for moving said element into position to stop said flow, and means compelling such operation of the second named means as a prerequisite to the placing of said nozzle on its support.

25. In a dispensing apparatus, in combination with a pump housing, a delivery hose having a discharge nozzle through which liquid to be dispensed is adapted to be forced, means for forcing liquid through said hose, a control device for said forcing means including an actuator, means adapted to engage said hose, a tiltable member connected to said means, said tiltable member being adapted to be shifted into a plurality of tiltable positions by lateral pull on said hose, and a connection from said tiltable member to said actuator for shifting said actuator in any tilted position of said tiltable member.

26. In a liquid dispensing apparatus the combination of a pump the suction side of which is adapted to be connected to a source of liquid supply, a motor for operating said pump, a switch for selectively operating said motor, a meter the inlet side of which is connected to the outlet side of said pump, indicating means operated by said meter for showing the amounts dispensed, a flexible hose connected to the outlet side of said meter, a nozzle for said hose, said switch having a member for control thereof, a movable member disposed adjacent said switch and flexibly associated with said hose whereby movement of said hose moves said last named member, means interposed between said movable member and said member whereby movement of said movable member operates said switch, and means engageable by said nozzle for preventing operation of said switch.

27. In liquid dispensing apparatus, the combination of a casing, a pump disposed in said casing, the inlet side of said pump being adapted to be connected to a source of liquid supply, metering and indicating means connected to the outlet side of said pump, a dispensing hose connected to the outlet side of said metering means, said hose having a dispensing nozzle, operating means manually operated for operating said pump, control means for controlling operation of said operating means, a support on said casing for supporting said nozzle when said control means is inoperative, and means adjacent said support for preventing operation of said control means when said nozzle is on said support.

28. In liquid dispensing apparatus, the combination of a casing, a pump disposed in said casing, the inlet side of said pump being adapted to be connected to a source of liquid supply, metering and indicating means connected to the outlet side of said pump, a dispensing hose connected to the outlet side of said metering means, said hose having a dispensing nozzle, a switch operable to actuate the pump, control means for controlling operation of said switch, a support on said casing for supporting said nozzle when said control means is inoperative, said nozzle being disposed to prevent substantial movement of said control means when said nozzle is supported on said support whereby said switch cannot be closed until said nozzle is removed from said support.

29. In liquid dispensing apparatus, the combination of a casing, a pump disposed in said casing, metering and indicating means associated with said pump for measuring and indicating the dispensed liquid, a dispensing hose having a dispensing nozzle for dispensing liquid measured by said metering and indicating means, operating means manually operated for operating said pump, control means for controlling operation of said operating means, a support on said casing for supporting said nozzle when said control means is inoperative, and means adjacent said support for preventing operation of said control means when said nozzle is on said support.

30. In liquid dispensing apparatus, the combination of a casing, a pump disposed in said casing, metering and indicating means associated with said pump for measuring and indicating the dispensed liquid, a dispensing hose having a dispensing nozzle for dispensing liquid measured by said metering and indicating means, a switch operable to actuate the pump, control means for controlling operation of said switch, a support on said casing for supporting said nozzle when said control means is inoperative, said nozzle being disposed to prevent substantial movement of said control means when said nozzle is supported on said support whereby said switch cannot be closed until said nozzle is removed from said support.

31. In liquid dispensing apparatus, the combination of a casing, a pump disposed in said casing, metering and indicating means associated with said pump for measuring and indicating the dispensed liquid, a dispensing hose having a dispensing nozzle for dispensing liquid measured by said metering and indicating means, a switch operable to actuate the pump, control means for controlling operation of said switch, a fixed support on said casing adjacent said control means for supporting said nozzle when said control means is inoperative, said nozzle being disposed to prevent substantial movement of said control means when said nozzle is supported on said support whereby said switch cannot be closed until said nozzle is removed from said support.

RUSSELL A. DEMPSEY.
WILLIAM HALKENHAUSER.